United States Patent
Alderson

(10) Patent No.: US 12,089,590 B2
(45) Date of Patent: *Sep. 17, 2024

(54) SHELF-STABLE ANTIMICROBIAL COMPOSITIONS

(71) Applicant: VIROX TECHNOLOGIES INC., Oakville (CA)

(72) Inventor: Faraz A. Alderson, Mississauga (CA)

(73) Assignee: VIROX TECHNOLOGIES, INC., Oakville (CA)

(*) Notice: Subject to any disclaimer, the term of this patent is extended or adjusted under 35 U.S.C. 154(b) by 894 days.

This patent is subject to a terminal disclaimer.

(21) Appl. No.: 17/145,552

(22) Filed: Jan. 11, 2021

(65) Prior Publication Data

US 2021/0127666 A1    May 6, 2021

Related U.S. Application Data

(63) Continuation-in-part of application No. 16/268,752, filed on Feb. 6, 2019, now Pat. No. 10,952,430.

(51) Int. Cl.
| | | |
|---|---|---|
| A61L 2/00 | (2006.01) | |
| A01N 25/22 | (2006.01) | |
| A01N 25/30 | (2006.01) | |
| A01N 37/10 | (2006.01) | |
| A01N 59/00 | (2006.01) | |
| A61K 31/28 | (2006.01) | |

(52) U.S. Cl.
CPC ............ *A01N 25/22* (2013.01); *A01N 37/10* (2013.01); *A01N 2300/00* (2013.01)

(58) Field of Classification Search
CPC ............ A61Q 17/005; A61K 2800/596; A01N 25/30; A01N 31/02; A01N 37/10; A01N 41/04; A01N 59/00; A61P 31/04
See application file for complete search history.

(56) References Cited

U.S. PATENT DOCUMENTS

| | | |
|---|---|---|
| 4,975,217 A | 12/1990 | Brown-Skrobot et al. |
| 6,207,058 B1 | 3/2001 | Ventura et al. |
| 6,451,333 B1 | 9/2002 | Beerse et al. |
| 6,521,028 B1 | 2/2003 | Frenier |
| 6,554,912 B2 | 4/2003 | Sahbari |
| 7,098,178 B2 | 8/2006 | Gerke et al. |
| 7,354,604 B2 | 4/2008 | Ramirez et al. |
| 7,674,755 B2 | 3/2010 | Egbe et al. |
| 7,985,725 B2 | 7/2011 | Tippets et al. |
| 8,163,075 B2 | 4/2012 | Kennedy et al. |
| 8,304,378 B2 | 11/2012 | Baars et al. |
| 8,354,172 B2 | 1/2013 | Rodrigues |
| 8,591,958 B2 | 11/2013 | Omidbakhsh et al. |
| 9,090,859 B2 | 7/2015 | Little |
| 9,233,180 B2 | 1/2016 | Omidbakhsh et al. |
| 9,255,468 B2 | 2/2016 | Reyes et al. |
| 9,327,966 B2 | 5/2016 | Gernmill et al. |
| 9,714,389 B2 | 7/2017 | See et al. |
| 9,732,071 B2 | 8/2017 | Patron et al. |
| 10,238,108 B2 † | 3/2019 | Griese |
| 2001/0051318 A1 | 12/2001 | Chu |
| 2002/0155969 A1 | 10/2002 | Rees et al. |
| 2005/0019421 A1 | 1/2005 | Hobbs et al. |
| 2005/0217534 A1 | 10/2005 | Stockel et al. |
| 2005/0245412 A1 | 11/2005 | Shah et al. |
| 2006/0142172 A1 | 6/2006 | Cioletti et al. |
| 2006/0160712 A1 | 7/2006 | Hei |
| 2007/0027119 A1 | 2/2007 | Ahmed et al. |
| 2007/0137507 A1 | 6/2007 | Ramasamy |
| 2008/0287538 A1 | 11/2008 | Scholz et al. |
| 2009/0099382 A1 | 4/2009 | Gerke et al. |
| 2009/0192231 A1* | 7/2009 | Lemons ............... A01N 37/36 514/738 |
| 2009/0301996 A1 | 12/2009 | Visintin et al. |

(Continued)

FOREIGN PATENT DOCUMENTS

| | | |
|---|---|---|
| AU | 5173785 | 7/1986 |
| CA | 324931 | 8/1932 |
| CA | 1150089 | 7/1983 |
| CA | 2503627 | 6/2004 |
| CA | 2806329 | 2/2012 |
| CA | 2867823 | 7/2015 |
| CN | 109 135 939 | 1/2019 |

(Continued)

OTHER PUBLICATIONS

Chemical Book, "Furoic Acid", available at https://www.chemicalbook.com/ProductChemicalPropertiesCB2189363_EN.htm, 2 pages, 2017.
R. Williams, pKa data compiled by R. Williams, 2011, available at https://organicchemistrydata.org/hansreich/resources/pka/pka_data/pka-compilation-williams.pdf 33 pages.
Zeng et al., "Estimation of pKa values for carboxylic acids, alcohols, phenols and amines using changes in the relative Gibbs free energy", Fluid Phase Equilibria, 2012, vol. 313, pp. 148-155.

(Continued)

*Primary Examiner* — Tracy Liu
(74) *Attorney, Agent, or Firm* — Clark & Brody LP

(57) ABSTRACT

A shelf-stable concentrated antimicrobial composition and method of using same comprises: at least one cyclic carboxylic acid and/or salt thereof in an amount from about 1 wt. % to about 10 wt. %; at least one anionic surfactant in an amount from about 10 wt. % to about 35 wt. %; at least one non-surfactant strong acid having a pKa less than about 2.3 in an amount from about 2 wt. % to about 25 wt. %; and at least one chelating agent in an amount from about 0.1 wt. % to about 10 wt. %. The composition retains at least 90% of its original antimicrobial efficacy after storage for at least five years at room temperature, and is substantially free of hydrogen peroxide, sources of hydrogen peroxide, parabens, aldehydes, aldehyde releasing agents, phenols, biguanides, peroxycarboxylic acids, quaternary ammonium compounds, chlorine compounds, enzymes, and etchants.

21 Claims, 1 Drawing Sheet

(56) References Cited

U.S. PATENT DOCUMENTS

| | | |
|---|---|---|
| 2010/0093596 A1 | 4/2010 | Tadrowski |
| 2010/0093597 A1 | 4/2010 | Tadrowski |
| 2010/0234328 A1 | 9/2010 | Ahmed |
| 2010/0234460 A1 | 9/2010 | Foret et al. |
| 2010/0273695 A1 | 10/2010 | Sehgal et al. |
| 2011/0262557 A1 | 10/2011 | Omidbakhsh |
| 2013/0137618 A1 | 5/2013 | Wood |
| 2013/0146545 A1 | 6/2013 | Pabalan et al. |
| 2013/0164236 A1 | 6/2013 | Yarlagadda et al. |
| 2013/0164352 A1 | 6/2013 | Yarlagadda et al. |
| 2013/0316939 A1 | 11/2013 | Moragas Arjant |
| 2014/0044596 A1† | 2/2014 | Omidbakhsh |
| 2015/0305343 A1 | 10/2015 | Burke |
| 2016/0010035 A1 | 1/2016 | Liu et al. |
| 2016/0090523 A1 | 3/2016 | Ravi et al. |
| 2016/0135453 A1 | 5/2016 | Pedersen et al. |
| 2016/0177164 A1 | 6/2016 | Dillon et al. |
| 2016/0376263 A1 | 12/2016 | Patron et al. |
| 2017/0022458 A1 | 1/2017 | Trujillo et al. |
| 2017/0044466 A1* | 2/2017 | van Buskirk .......... C11D 1/662 |
| 2017/0087199 A1 | 3/2017 | Patron et al. |
| 2018/0187129 A1 | 7/2018 | Traistaru et al. |
| 2018/0303090 A1 | 10/2018 | Budhian et al. |
| 2019/0090480 A1 | 3/2019 | Lo et al. |
| 2019/0090483 A1† | 3/2019 | Hanson |
| 2020/0245615 A1 | 8/2020 | Ahmadpour |
| 2021/0127666 A1 | 5/2021 | Alderson |

FOREIGN PATENT DOCUMENTS

| | | |
|---|---|---|
| CN | 109 289 539 | 2/2019 |
| EP | 0904343 | 2/2004 |
| EP | 1965418 | 9/2008 |
| EP | 2108039 | 10/2009 |
| EP | 2102325 | 4/2011 |
| EP | 1752829 | 4/2012 |
| GB | 2370042 | 6/2002 |
| HK | 1158253 | 7/2012 |
| KR | 100942009 | 2/2010 |
| KR | 101172922 | 8/2012 |
| SG | 153495 | 7/2009 |
| SG | 168946 | 3/2011 |
| WO | 2001/081635 | 11/2001 |
| WO | 0181635 | 11/2001 |
| WO | 2004/037965 | 5/2004 |
| WO | 2008/080097 | 7/2008 |
| WO | 2009/125336 | 10/2009 |
| WO | 2014/032269 | 3/2014 |
| WO | 2014/138593 | 9/2014 |
| WO | 2015/038117 | 3/2015 |
| WO | 2017/222963 | 12/2017 |
| WO | 2017/222965 | 12/2017 |
| WO | 2020/161648 | 8/2020 |

OTHER PUBLICATIONS

Zeng et al., "Estimation of pKa values for carboxylic acids, alcohols, phenols and amines using changes in the relative Gibbs free energy", Fluid Phase Equilibria, 2012, vol. 313, pp. 148-155 ("Zeng").†

\* cited by examiner
† cited by third party

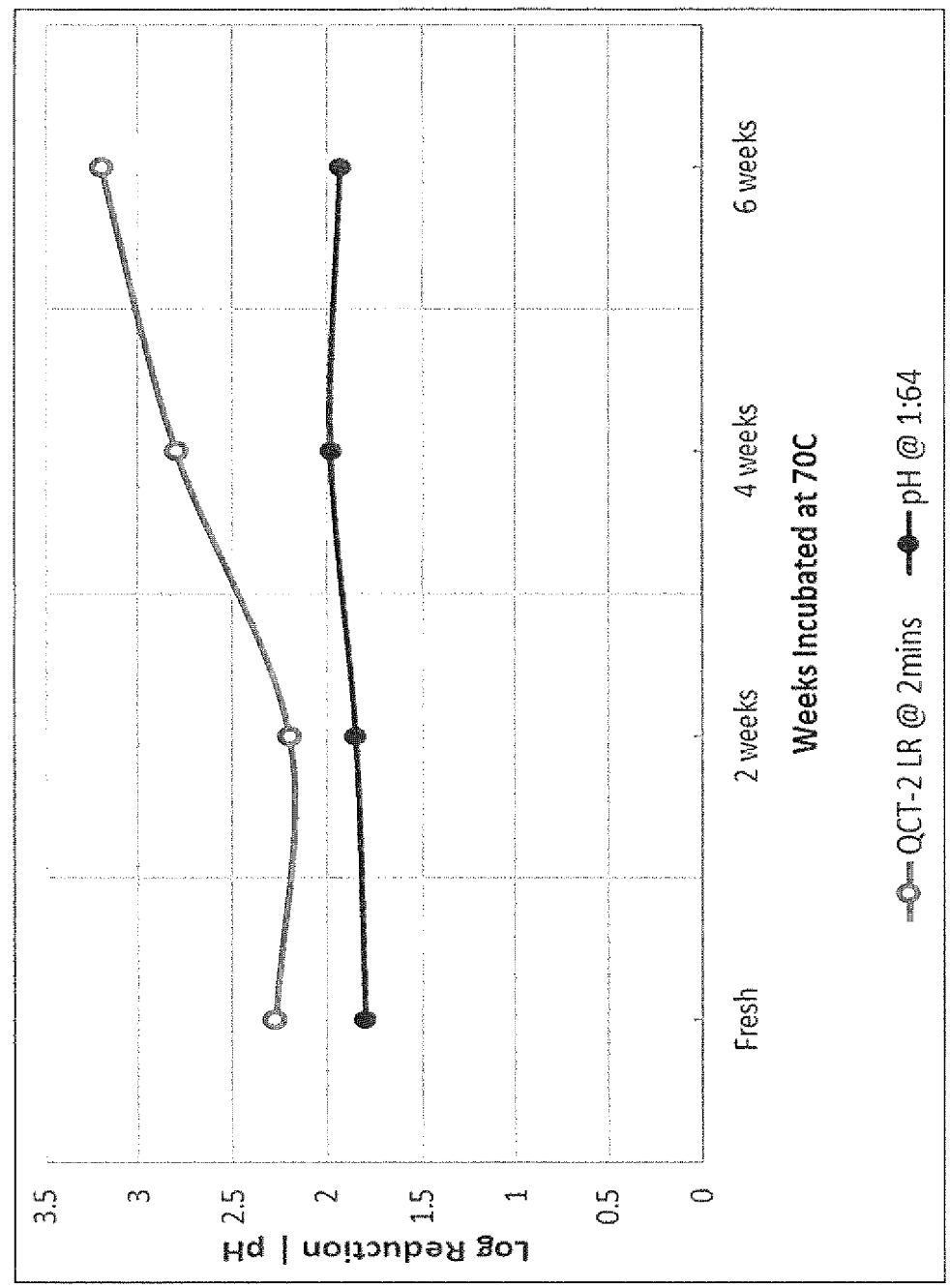

SHELF-STABLE ANTIMICROBIAL COMPOSITIONS

CROSS-REFERENCE TO RELATED APPLICATION

This application is a continuation-in-part of application Ser. No. 16/268,752 filed Feb. 6, 2019 (which is not admitted to be prior art with respect to the present invention by its mention in this cross-reference section), the entire contents of which are incorporated herein by reference.

FIELD OF THE INVENTION

The present invention relates to antimicrobial compositions and methods for using same to reduce the microbial load on surfaces.

BACKGROUND OF THE INVENTION

Antimicrobial compositions, such as those based on peroxygen compounds, peracids (also referred to as percarboxylic acids, such as peracetic acid), quaternary ammonium compounds, chlorine bleaches, aldehydes (such as formaldehyde, glutaraldehyde), and biguanides, typically have a shelf-life of from about 1-3 years. Consequently, products can expire or lose their efficacy prior to use which clearly bears negative consequences in terms of costs and utility. The problem can be compounded by inappropriate storage conditions, such as storage in places subject to increased temperatures, e.g. outdoors during summer months or in warm climates.

There is therefore a need for antimicrobial compositions with improved shelf-life and the present invention is intended to meet this need.

SUMMARY OF THE INVENTION

Accordingly, a first aspect of the invention provides a shelf-stable concentrated antimicrobial composition comprising, consisting essentially of, or consisting of:
 a. at least one cyclic carboxylic acid and/or salt thereof in an amount from about 1 wt. % to about 10 wt. %;
 b. at least one anionic surfactant in an amount from about 10 wt. % to about 35 wt %;
 c. at least one non-surfactant strong acid having a pKa less than about 2.3 in an amount from about 2 wt. % to about 25 wt. %;
 d. at least one chelating agent in an amount from about 0.1 wt. % to about 10 wt. %;
 e. optionally, at least one corrosion inhibitor in an amount of from about 0.1 wt. % to about 2 wt. %;
 f. optionally, at least one nonionic surfactant in an amount from about 15 wt. % to about 25 wt. %;
 g. optionally, at least one organic solvent in an amount from about 25 wt. % to about 36 wt. %; and
 h. optionally, water, q.s. to 100.

wherein the composition retains at least 90% of its original antimicrobial efficacy after storage for at least five years at room temperature, and is substantially free of hydrogen peroxide, sources of hydrogen peroxide, parabens, aldehydes, aldehyde releasing agents, phenols, biguanides, peroxycarboxylic acids, quaternary ammonium compounds, chlorine compounds, enzymes, and etchants.

In some embodiments, the invention provides a shelf-stable concentrated antimicrobial composition comprising, consisting essentially of, or consisting of:
 a. at least one cyclic carboxylic acid and/or salt thereof in an amount from about 2.8 wt. % to about 3.3 wt. %;
 b. at least one anionic surfactant in an amount from about 26 wt. % to about 30 wt. %;
 c. at least one non-surfactant strong acid having a pKa less than about 2.3 in an amount from about 11 wt. % to about 15 wt. %;
 d. at least one chelating agent in an amount from about 0.3 wt. % to about 0.8 wt. %;
 e. at least one corrosion inhibitor in an amount of from about 0.2 wt. % to about 0.5 wt. %;
 f. at least one nonionic surfactant in an amount from about 17 wt. % to about 22 wt %;
 g. at least one organic solvent in an amount from about 27 wt. % to about 33 wt. %; and
 h. water, q.s. to 100;

wherein the composition retains at least 90% of its original antimicrobial efficacy after storage for at least five years at room temperature, and is substantially free of hydrogen peroxide, sources of hydrogen peroxide, parabens, aldehydes, aldehyde releasing agents, phenols, biguanides, peroxycarboxylic acids, quaternary ammonium compounds, chlorine compounds, enzymes, and etchants.

In some embodiments, the at least one cyclic carboxylic acid is selected from the group consisting of salicylic acid, furoic acid, mandelic acid, phthalic acid, phenylacetic acid and benzoic acid.

In the same or other embodiments, the at least one non-surfactant acid having a pKa less than about 2.3 is selected from the group consisting of phosphoric acid, pyrophosphoric acid, phosphonic acid, polyphosphoric acid, methane sulfonic acid, benzene sulfonic acid, ethane sulfonic acid, propane sulfonic acid, butane sulfonic acid, toluene sulfonic acid, xylene sulfonic acid, sulfosalicylic acid, and sulfamic acid.

Furthermore, the anionic surfactant can be selected from the group consisting of C8-C18 alkyl benzene sulfonic acids, C6-C18 diphenyloxide disulfonic acids, C6-C22 alkyl phosphate esters, alkyl sulfuric acids, alkyl ether sulfuric acids, alkyl-(ethoxy/propoxy)carboxylic acids, acyl amino acids, and salts thereof. An example of an alkyl sulfuric acid salt that can be used in the present composition is sodium lauryl sulfate (SLS). An alkyl ether sulfuric acid salt that can be used is sodium laureth sulfate (SLES). An exemplary alkyl-(ethoxy/propoxy)carboxylic acid is capryleth-6 carboxylic acid. Also, an example of an acyl amino acid salt that can be used is sodium capryloyl glutamate.

In situations where the composition is to be used to sanitize or disinfect metal surfaces or metal articles, an effective amount of at least one corrosion inhibitor (e.g. benzotriazole and tolyltriazole) can be included to prevent decomposition of the metal surface or article. The corrosion inhibitor can be present in an amount of from about 0.1 wt. % to about 2 wt. %, or from about 0.2 wt. % to about 0.5 wt. %, in the concentrated composition.

To enhance the detersive or cleaning properties, for example, when the composition is to be used to disinfect or sanitize soiled surfaces, the composition can include an effective amount of at least one nonionic surfactant, such as a C6-C18 ethoxylated and/or propoxylated alcohol, alkyl glucosides, and alkyl polyglucosides. The at least one nonionic surfactant can be present in an amount from about 15 wt. % to about 25 wt. %, or from about 17 wt. % to about 22 wt. %.

In some embodiments, the composition can include an effective amount of at least one organic solvent to solubilize ingredients and enhance phase stability and cleaning power.

The organic solvent can be present in an amount from about 25 wt. % to about 36 wt. % and is chosen so as to be compatible with the other ingredients in the composition. Any compatible solvent known to the skilled person can be used including propylene glycol, dipropylene glycol, diethylene glycol n-butyl ether, diethylene glycol n-propyl ether, diethylene glycol ethyl ether, diethylene glycol methyl ether, diethylene glycol t-butyl ether, dipropylene glycol n-butyl ether, dipropylene glycol methyl ether, dipropylene glycol ethyl ether, dipropylene glycol propyl ether, dipropylene glycol tert-butyl ether, ethylene glycol butyl ether, ethylene glycol propyl ether, ethylene glycol ethyl ether, ethylene glycol methyl ether, ethylene glycol methyl ether acetate, propylene glycol n-butyl ether, propylene glycol ethyl ether, propylene glycol methyl ether, propylene glycol n-propyl ether, tripropylene glycol methyl ether and tripropylene glycol n-butyl ether, ethylene glycol phenyl ether, and propylene glycol phenyl ether.

Compositions according to the present invention have at least one strong non-surfactant acid as would be known to the person skilled in the art of disinfection. The term "strong" is defined to mean an acid that functions to reduce the pH of the final diluted ready-to-use version of the present composition to within the ranges disclosed herein and using the dilution ratios disclosed herein. Generally, the acid will have a pKa of up to about 2.3. When used herein, the term "non-surfactant acid" means an acid that does not materially affect the detergency of the composition whether in concentrated or ready-to-use form. Examples include, but are not limited to, phosphoric acid, pyrophosphoric acid, phosphonic acid, polyphosphoric acid, methane sulfonic acid, benzene sulfonic acid, ethane sulfonic acid, propane sulfonic acid, butane sulfonic acid, toluene sulfonic acid, xylene sulfonic acid, sulfosalicylic acid, and sulfamic acid. Surfactant acids are undesirable as they may leave a sticky or tacky residue on the surface to be disinfected.

The present inventive compositions have at least one chelating agent known to the skilled person as being useful in disinfecting compositions, including etidronic acid (also referred to has 1-hydroxyethane-1,1-diphosphonic acid or HEDP), nitrilotrimethylphosphonic acid, 2-phosphonobutane-1,2,4-tricarboxylic acid, diethylenetriamine penta(methylene phosphonic acid), dihexylenetriamine penta(methylene phosphonic acid), ethylenediamine tetra(methylene phosphonic acid), hexaethylenediamine tetra(methylene phosphonic acid), 2-hydroxyphosphonocarboxylic acid, N,N-dicarboxymethyl glutamic acid, picolinic acid, dipicolinic acid, nitrolotriacetic acid, ethylenediamine tetrakis methylenephosphonic acid, diethylenetriamine pentakis methylenephosphonic acid, cyclohexane-1,2-tetramethylene phosphonic acid, amino[tri(methylene phosphonic acid)], and/or salts thereof.

Water may be present in commercial sources of the ingredients used to make the composition as would be known to the skilled person. Alternatively or additionally, water may be added, q.s. to 100. Compositions according to the invention are concentrated and typically require dilution prior to use with water, one or more organic solvents, or combinations thereof. The ratio of dilution (composition: diluent) can be from about 1:1, about 1:2, about 1:4, about 1:8, about 1:16, about 1:32, or about 1:40, and up to about 1:512, about 1:256, about 1:128, or about 1:64.

In embodiments wherein water is present, the pH of the compositions can be up to about 1.5, 1.4, 1.3, 1.2, 1.1, 1.0, 0.9, 0.8, 0.7, 0.6, 0.5, 0.4, 0.3, or 0.2. When the embodiment are diluted with water to provide ready-to-use (RTU) solutions, the composition should have a pH that is low enough to cause the RTU solution to be antimicrobially effective. Preferably, the pH of the RTU solution will range from about 1.6, 1.7, 1.8, 1.9, 2.0, 2.1, 2.2, 2.3, or 2.4 and up to about 3.5, 3.4, 3.3, 3.2, 3.1, 3.0, 2.9, 2.8, 2.7, 2.6, or 2.5. This is achieved by using enough of the strong non-surfactant acid described above in the concentrated composition, having regard to the above dilution ratios.

In accordance with another aspect, the invention provides a method of reducing the microbial load on a surface contaminated with microbes, the method comprising, consisting essentially of, or consisting of a. identifying a surface in need of microbial reduction; b. providing a composition according to the first aspect; c. optionally diluting the composition with a diluent to provide a diluted composition; and d. applying the composition or diluted composition to the surface for up to five minutes.

To further enhance the antimicrobial efficacy of the composition, the user can add an effective amount of an additional antimicrobial compound prior to use. Known antimicrobial compounds include hydrogen peroxide.

Depending on the dilution ratio, contact time employed, and presence of any additional antimicrobial compounds, the present method can be effective to reduce the population of a wide variety of microorganisms, including mycobacteria, viruses, bacteria, fungi, and bacterial spores, by at least 1, 2, 3, 4, 5, or 6, log using test method ASTM E2197. Embodiments of compositions according to the invention can function as a sanitizer, disinfectant, sterilant, or sporicide depending on these same factors.

The concentrated compositions according to the first aspect of the invention can be made from a kit of parts, wherein components of the composition are stored in separate containers, vessels, or packages. The separate components can then be combined and optionally diluted with a diluent prior to use. Dry compositions can also be formulated using dry forms of the composition ingredients (packaged separately or in combination) and combined with a liquid diluent, e.g. water and/or at least one organic solvent, prior to use. It will be appreciated that the concentrated composition, in dry or liquid form, whether the ingredients are packaged together or separately, will be more economical to store and transport than their diluted, ready-to-use versions.

Embodiments of the present concentrated compositions are surprisingly shelf-stable, as will be further described below. It is also anticipated that the diluted ready-to-use embodiments of the present invention will have comparatively longer shelf stability.

The present invention contemplates the possibility of omitting any components whether or not they are recited herein and also of including components that fall within classes of compounds disclosed herein but which additional components may not be expressly recited. Furthermore, the present invention contemplates using an ingredient that performs multiple functions and meets multiple claim limitations. For example, some ingredients can be both a chelating agent and a cyclic carboxylic acid, such as salicylic acid. Other ingredients can be both a chelating agent and a non-surfactant strong acid, such as etidronic acid.

BRIEF DESCRIPTION OF THE DRAWING

An embodiment of the invention will now be described with reference to the drawing in which FIG. 1 is a graph depicting the bacterial log reduction achieved by, and pH of, a solution according to the invention stored at 70° C., over a 6-week period.

DETAILED DESCRIPTION OF THE EMBODIMENTS

To avoid ambiguity, certain terms are defined in the specification, as follows.

The term "comprising" means "including without limitation." Thus, a composition comprising a list of ingredients may include additional ingredients not expressly recited. The term "consisting of" means "including the listed ingredients and such additional ingredients as may be present as natural or commercial impurities or additives." Natural and commercial impurities will be apparent to the person of ordinary skill in the art. An example of a commercial additive is minute quantities of stabilizers in hydrogen peroxide commercial compositions, for example. The term "consisting essentially of" means "consisting of the listed ingredients (as defined herein) plus such additional ingredients as would not materially and negatively affect the basic and novel properties of the composition." By "basic and novel properties" is meant the shelf-stability of the composition.

As used herein, the term "about" means a variation in a numerical quantity that can occur for any reason whatsoever in the real world, such as, for example, through typical measuring and liquid/solid handling procedures used for making concentrates or at use compositions, through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about", the claims include equivalents to the quantities. For the sake of definiteness and clarity, the term "about" means a variation of up to ±5%.

Compositions according to the invention are "shelf-stable." When used herein, a "shelf-stable" composition is one wherein at least 90% of the composition's original antimicrobial efficacy is retained after storage for at least five years at room temperature (about 21-23° C.). Storage at room temperature for five years can be mimicked by storage at 70° C. for five weeks as will be further discussed below. It will be appreciated that the present solutions may be effective for longer periods depending on the storage temperature.

As used herein, a composition or combination that is "substantially free of" one or more ingredients means a composition or combination that includes none of those ingredients or that includes only trace or incidental amounts of those ingredients. Trace or incidental amounts of an ingredient can be found in another ingredient as an impurity or as a by-product of a side reaction during formation or degradation of a component of the composition. For the sake of clarity, ingredients present in a trace or incidental amount will not be present in excess of 0.5 wt. %, based on the total weight of the composition.

The term "wt. %," "weight percent," "% w/w," "percent by weight," "%, by weight," "% w/w," and variations thereof refer to the concentration of a substance as the weight of that substance divided by the total weight of the composition and multiplied by 100.

As used herein, the term "microorganism" is used interchangeably with the term "microbe." Both are used herein to refer to any noncellular or unicellular (including colonial) organism. Microorganisms include all prokaryotes, i.e. bacteria (including cyanobacteria), lichens, yeasts, fungi, protozoa, virinos, viroids, viruses, phages, spores and some algae.

"Hard surfaces" include but are not limited to glass, ceramics, metal, natural and synthetic rock, wood, and certain polymers, elastomers, and plastics. "Soft surfaces" include but are not limited to woven and non-woven substrates, a food product (and its surfaces), a body or stream of water or a gas (e.g., an air stream), and the body of a living creature or part thereof, e.g. a human hand. Both hard and soft surfaces are encountered in the human and animal healthcare, hospitality, agriculture, food processing, and other industrial sectors.

The term "effective amount" of a compound means that amount which would provide the desired effect of the compound based on the compound's function and properties as would be apparent to the person of ordinary skill in the art reading the present disclosure.

When used herein, a composition is "effective" against microorganisms, if the microbial populations are reduced by at least about 90% as compared to what is achieved by flushing with water or other antimicrobially inert compositions. Larger reductions in microbial population provide greater levels of protection.

As used herein, the term "sanitizer" refers to an agent that reduces the number of bacterial contaminants to safe levels as judged by public health requirements. In an embodiment, sanitizers for use in this invention will provide at least a 99.9% reduction (3-log order reduction). These reductions can be evaluated using a procedure set out in Germicidal and Detergent Sanitizing Action of Disinfectants, Official Methods of Analysis of the Association of Official Analytical Chemists, paragraph 960.09 and applicable sections, 15th Edition, 1990 (EPA Guideline 91-2). "Disinfectant" refers to an agent that kills most vegetative cells including most recognized pathogenic microorganisms, using the procedure described in A.O.A.C. Use Dilution Methods, Official Methods of Analysis of the Association of Official Analytical Chemists, paragraph 955.14 and applicable sections, 15th Edition, 1990 (EPA Guideline 91-2). "Sterilant" refers to an agent that destroys all viable forms of microbial life. "Sporicide" refers to a physical or chemical agent or process having the ability to cause greater than a 90% reduction (1-log order reduction) in the population of spores of *Bacillus subtilis*, *Clostridium difficile*, or *Clostridium sporogenes* within 30 minutes at room temperature.

In the description and claims, the singular forms "a," "an," and "the" include plural referents unless the context clearly dictates otherwise. Thus, for example, reference to a composition containing "a compound" includes a composition having two or more compounds. It should also be noted that the term "or" is generally employed in the sense of "and/or" unless the context clearly dictates otherwise.

Unless otherwise specified, the term "alkyl" or "alkyl group" refers to hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups or "cycloalkyl" or "alicyclic" or "carbocyclic" groups (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups, etc.).

Also, unless otherwise specified, the term "alkyl" includes both "unsubstituted alkyls" and "substituted alkyls." The term "substituted alkyls" refers to alkyl groups having substituents replacing one or more hydrogens on one or more carbons of the hydrocarbon backbone. Such substituents may include, for example, alkenyl, alkynyl, halogens, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonate, phosphine, cyano, amino (including alkyl amino, dialkylamino, arylamino, diarylamino, and alkylarylamino), acylamino (including alkylcarbonylamino, arylcarbonylamino, carbamoyl and uredo), amine, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including hetero aromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

Cyclic Carboxylic Acids and Salts Thereof

Composition according to the invention will contain at least one cyclic carboxylic acid and/or salt thereof, such as salicylic acid, benzoic acid, furoic acid, phthalic acid, phenylacetic acid and/or salts thereof. These acids and salts thereof function to enhance the microbicidal efficacy of the composition. These compounds are present in the concentrated compositions at a concentration of from about 1, 2, 2.2, 2.4, 2.6, 2.8, or 3 wt. % to up to about 10, 8, 6, 4, 3.8, 3.6, 3.4, 3.3, or 3.2 wt. %.

Anionic Surfactants

Compositions according to the invention comprise at least one anionic surfactant which enhance the antimicrobial efficacy in the composition. The anionic surfactant can be alkyl sulfonic acids, alkyl aryl sulfonic acids, alkyl sulfuric acids, alkyl ether sulfuric acids, those carboxylic acids that function as surfactants (e.g. alkyl sulfonated carboxylic acids, alkyl-(ethoxy/propoxy)carboxylic acids and amino acid-based surfactants, such as acyl amino acids), alkyl or alkenyl esters or diesters of sulfosuccinic acids, and salts thereof.

Sulfonated carboxylic acids and salts thereof include sulfonated 9-octadecanoic acid, disodium 2-sulfo C12-C18 fatty acid salts and sodium methyl-2-sulfo C12-C16 esters.

Exemplary salts include alkyl sulfates, alkyl ether sulfates, alkyl sarcosinates, linear and branched primary and secondary alkyl sulfates, alkyl ethoxysulfates, fatty oleyl glycerol sulfates, alkyl phenol ethylene oxide ether sulfates, glutamine sulfates, and sulfates of alkylpolysaccharides such as the sulfates of alkylpolyglucoside, alkyl poly(ethyleneoxy)ether sulfates and aromatic poly(ethyleneoxy) sulfates such as the sulfates of ethylene oxide and nonyl phenol (usually having 1 to 6 oxyethylene groups per molecule), $C_6$-$C_{24}$ alkylbenzene sulfonates; $C_6$-$C_{24}$ olefin sulfonates; $C_6$-$C_{24}$ paraffin sulfonates; cumene sulfonate; xylene sulfonate; $C_6$-$C_{24}$ alcohol sulfates (preferably $C_6$-$C_{12}$ alcohol sulfates); and $C_6$-$C_{24}$ alcohol ether sulfates having 1 to about 20 ethylene oxide groups.

Carboxylic acid surfactants and salts thereof include alkanoic acids (and alkanoates), ester carboxylic acids, alkyl succinates, ether carboxylic acids, alkyl ethoxy carboxylates, alkyl aryl ethoxy carboxylates, alkyl polyethoxy polycarboxylate surfactants and soaps. Secondary carboxylates useful in the present compositions include those which contain a carboxyl unit connected to a secondary carbon. Suitable secondary soap surfactants typically contain 11-13 total carbon atoms, although more carbons atoms (e.g., up to 16) can be present. Suitable carboxylates also include acylamino acids (and salts), such as acylglutamates, acyl peptides, taurates (e.g. N-acyl taurates and fatty acid amides of methyl tauride), and the like. Suitable alkyl aryl ethoxy carboxylates include those available commercially in association with the trademarks or trade names Neodox 23-4, a $C_{12-13}$ alkyl polyethoxy (4) carboxylic acid (Shell Chemical), and Emcol CNP-110, a $C_9$ alkylaryl polyethoxy (10) carboxylic acid (Witco Chemical). Carboxylates are also available from Clariant, e.g. the product Sandopan® DTC, a $C_{13}$ alkyl polyethoxy (7) carboxylic acid.

Other suitable anionic surfactants include alkyl phosphonates, alkyl ether phosphonates, alkyl phosphates, alkyl ether phosphates, and phosphate esters.

The anionic surfactant is present in the concentrated composition in an amount from about 10, 12, 14, 16, 18, 20, 22, 22.5, 23, 23.5, 24, 24.5, 25, 25.5, 26, 26.5, or 27 wt. % and up to about 35, 33, 32, 31.5, 31, 30.5, 30, 29.5, 29 wt. %.

Non-Surfactant Strong Acids and Composition pH

Aqueous concentrated compositions according to the invention will contain at least one non-surfactant strong acid in an amount selected so that the diluted, ready-to-use versions of the compositions will have a pH ranging from about 1.6 to about 3.5, the range believed to give rise to optimal antimicrobial efficacy. Typically, aqueous concentrated compositions will have a pH ranging from about 0.2 to about 1.5. It is also possible for the composition to obtain a portion of its acidity from the use of anionic surfactants in their acid forms, although further acidification would be required and achieved by using the non-surfactant strong acid.

As mentioned above, the acid will have a pKa of up to about 2.3 and not be a surfactant, i.e. not materially affect the detergency of the composition, to avoid leaving a sticky or tacky residue on the surface to be sanitized or disinfected.

In order to not function as a surfactant, the acid will typically contain 10 or fewer carbon atoms in their molecules and four or fewer carbon atoms in any linear or branched chain component of the molecule. The carbonic component of the molecule could be substituted, unsubstituted, saturated or unsaturated.

Non-surfactant acids can include methane sulfonic acid, ethane sulfonic acid, propane sulfonic acid, butane sulfonic acid, toluene sulfonic acid, xylene sulfonic acid, sulfosalicylic acid, sulfamic acid, benzenesulfonic acid, benzene disulfonic acid, cumene sulfonic acid, sulfosalicylic acid, naphthalene mono- or di-sulfonic acid, sulfosuccinic acid, isethionic acid, and phosphorous based acids (e.g. phosphoric acid, pyrophosphoric acid, phosphonic acid, polyphosphoric acid), nitric acid, sulfuric acid, and hydrochloric acid.

The at least one non-surfactant acid is present in concentrated versions of the composition at a concentration of from about 2, 4, 6, 8, 8.5, 9, 9.5, 10, 10.5, 11, 11.5, or 12 wt. % and up to about 32, 30, 28, 26, 24, 22, 20, 18, 17.5, 17, 16.5, 16, 15.5, 15, 14.5, or 14 wt. %.

Chelating Agents

The present composition employs at least one chelating agent, which aids in removing metal ions from water and is believed to further enhance the overall antimicrobial efficacy of the composition. Examples that can be used in the context of the present invention include phosphoric acid, sodium stannate, ethylene diamine tetraacetic acid (EDTA), 2-hydroxyethyl ethylenediaminetriacetic acid (HEDTA), tertiary amine-based chelating agents, and phosphonate-based chelating agents, and salts thereof. The tertiary amine-based chelating agent includes at least one tertiary amine group in each molecule. Examples of tertiary amine-based chelating agents include L-glutamic acid N,N-diacetic acid (GLDA), methylglycine diacetic acid (MGDA), diethylenetriaminepentaacetic acid (also referred to as pentetic acid or DTPA), and nitrilotriacetic acid (NTA). The phosphonate-based chelating agent employed herein contains at least one phosphonate or phosphonic acid group in each molecule. Examples include 1-hydroxyethane-1,1-diphosphonic acid (HEDP or etidronic acid), aminotrimethylene phosphonic acid (ATMP), di-ethylene tri-amine pentakis methyleneph-osphonic acid (DTPMP), ethylene di-amine tetrakis methyienephosphonic acid (EDTMP), hexamethylenediamine-tetrakis methylenephosphonic acid (HDTMP), cyclohexane-1,2-tetramethylene phosphonic acid, 2-phosphonobutane-1,2,4-tricarboxylic acid (PBTC), and salts thereof. Exemplary salts include alkali metal salts, ammonium salts, alkyloyl amine salts (e.g. mono, di, or tetra-ethanolamine salts). The skilled person will appreciate that certain chelating agents, e.g. phosphoric acid and most phosphonate-based chelating agents in their acid form, also function as a "strong acid" as defined herein.

The at least one chelating agent is present in the concentrated compositions at a concentration of from about 0.1, 0.2, 0.3, or 0.4, 0.5, 0.6, or 0.7 wt. %, and up to about 10, 8, 6, 4, 2, 1.9, 1.8, 1.7, 1.6, 1.5, 1.4, 1.3, 1.2, 1.1, 1, 0.9, or 0.8 wt. %.

Optional Ingredients

The compositions according to the invention can include additional optional ingredients as follows.

Corrosion Inhibitors

The composition of the present invention can also include at least one corrosion inhibitor when the composition is to be used on metal substrates. Suitable corrosion inhibitors include triazoles, such as benzotriazole or tolytriazole. Other corrosion inhibitors include molybdate salts and zinc dithiophosphate. The corrosion inhibitor can be present in concentrated compositions in an amount starting from about 0.1, 0.2, 0.3, 0.4, 0.5, 0.6, 0.7, or 0.8 wt. %, and up to about 2, 1.9, 1.8, 1.7, 1.6, 1.5, 1.4, 1.3, 1.2, 1.1, 1, 0.9, 0.7, or 0.5 wt. %.

Nonionic Surfactants

The composition can further comprise at least one nonionic surfactant for enhanced cleaning. Suitable nonionic surfactants include a surfactant with ethylene oxide moieties, propylene oxide moieties or mixtures thereof, and surfactants with ethylene oxide-propylene oxide moieties in heteric, block or random heteric-block formation (e.g. block copolymers). Examples include alkyl ethylene oxide surfactants, alkyl propylene oxide surfactants, and alkyl ethylene oxide-propylene oxide surfactants. The nonionic surfactant can have any combination of ethylene oxide-propylene oxide moieties linked to an alkyl chain where the ethylene oxide and propylene oxide moieties may be in any randomized or ordered pattern and of any specific length. Nonionic moieties may be capped/terminated with a benzyl, alkoxy or short chain alkyl grouping.

The nonionic surfactants can be a condensation product of a saturated or unsaturated, straight or branched chain alcohol having from about 6 to 24 carbon atoms with about 3 to about 50 moles of ethylene oxide (i.e. alcohol ethoxylates). The alcohol moiety can consist of mixtures of alcohols in the above delineated carbon range or it can consist of an alcohol having a specific number of carbon atoms within this range. Examples of commercial surfactants of this chemistry are available under the trade name of Surfonic manufactured by Huntsman Corp., Austin, Tex., Pluronic manufactured by BASF Corp., Florham Park, N.J., and Neodol manufactured by Shell Chemical Co., Houston, Tex.

Other useful nonionics are alkyl glucosides and alkyl polyglucosides.

The at least one nonionic surfactant can be present in an amount from at least about 15, 17, 18, or 19 wt. % and up to about 25, 24, 23, 22, 21, or 20 wt. %.

Diluents/Solvents

The present invention provides compositions that can be in liquid or dry form. When in liquid form, the composition will comprise a liquid diluent, e.g. water and/or an organic solvent. When in dry form, the water and solvent are omitted and the remaining ingredients will be present as dry versions thereof. The skilled person will appreciate what forms of compounds in dry form can be combined with a liquid diluent to produce a liquid composition according to the invention (whether concentrated or ready-to-use).

The diluent provides a medium which dissolves, suspends, or carries the other components of the composition. The diluent can also function to deliver and wet the antimicrobial composition of the invention on an object. To this end, the diluent can contain any component or components that can facilitate these functions.

In certain embodiments, the present composition includes water in an amount of from about 25, 30, 35, 40, 45, 50, 65, 75, 85, or 90 wt. %, and up to about 99.8, 99, 97, 95, 93, 90 or 85 wt. %. In the same or other embodiments, the present composition can include about 1, 3, 5, 7, 10, 15, 20, 25, 30, 35, 40, 45, 50, 55, 60, 65 or 68 wt. % water.

Exemplary diluent organic solvents include glycols, glycol ethers and polyols. Examples of glycol ethers are diethylene glycol n-butyl ether, diethylene glycol n-propyl ether, diethylene glycol ethyl ether, diethylene glycol methyl ether, diethylene glycol t-butyl ether, dipropylene glycol n-butyl ether, dipropylene glycol methyl ether, dipropylene glycol ethyl ether, dipropylene glycol propyl ether, dipropylene glycol tert-butyl ether, ethylene glycol butyl ether, ethylene glycol propyl ether, ethylene glycol ethyl ether, ethylene glycol methyl ether, ethylene glycol methyl ether acetate, propylene glycol n-butyl ether, propylene glycol ethyl ether, propylene glycol methyl ether, propylene glycol n-propyl ether, tripropylene glycol methyl ether and tripropylene glycol n-butyl ether, ethylene glycol phenyl ether (commercially available as DOWANOL EPH from Dow Chemical Co.), propylene glycol phenyl ether (commercially available as DOWANOL PPH from Dow Chemical Co.), and the like, or mixtures thereof. Additional suitable commercially available glycol ethers (all of which are available from Union Carbide Corp.) include butoxyethyl PROPASOL, Butyl CARBITOL acetate, Butyl CARBITOL, Butyl CELLOSOLVE acetate, Butyl CELLOSOLVE, Butyl DIPROPASOL, Butyl PROPASOL, CARBITOL PM-600, CARBITOL Low Gravity, CELLOSOLVE acetate, CELLOSOLVE, Ester EEP, FILMER IBT, Hexyl CARBITOL, Hexyl CELLOSOLVE, Methyl CARBITOL, Methyl CELLOSOLVE acetate, Methyl CELLOSOLVE, Methyl DIPROPASOL, Methyl PROPASOL acetate, Methyl PROPASOL, Propyl CARBITOL, Propyl CELLOSOLVE, Propyl DIPROPASOL and Propyl PROPASOL. Examples of polyols are glycerol, sorbitol, and the like.

Other organic solvents that can be used are methanol, ethanol, butyl 3-hydroxybutyrate, isopropyl alcohol, ethylhexylglycerol, branched or unbranched diols, charged or uncharged non-surfactant emulsifying agents, dibasic esters, polar protic solvents, polar aprotic solvents (e.g. glycerine carbonate), and mixtures thereof.

Compositions according to the invention preferably comprise at least one glycol ether solvent to enhance the solubility of ingredients (e.g., salicylic acid) and to enhance cleaning efficacy against organic or inorganic soils. Examples include methoxytriglycol, ethoxytriglycol, butoxytriglycol, triethylyneglycol hexyl ether, propylene glycol methyl ether acetate, dipropylene glycol methyl ether acetate, dipropylene glycol n-butyl ether, propylene glycol n-butyl ether, dipropylene glycol n-propyl ether, propylene glycol n-propyl ether, dipropylene glycol methyl ether, and tripropylene glycol methyl ether.

The solvent can be present in a concentration of from about 25, 26, 27, 28, or 29 wt. % and up to about 36, 35, 34, 33, 32, or 31 wt. %.

Hydrotropes

The composition of the invention can also include one or more hydrotropes, some of which can also be the non-surfactant strong acids discussed above. The hydrotropes include but are not limited to aryl and alkylaryl sulfonic acids such as xylene sulfonic acid, cumene sulfonic acid, toluene sulfonic acid and their salts, polyether phosphate esters, and diphenyloxide disulfonates. These ingredients are useful for increasing the miscibility or solubility of organic and inorganic materials to produce a phase-stable aqueous composition. Hydrotropes can also help with cleaning organic soils.

When used in concentrated compositions, the hydrotrope can be present in an amount from about 0.5, 1, 3, 5, 10, or 20 wt. %, and up to about 25, 20, 15, 8, 4, or 1.5 wt. %.

Other Additional Ingredients

The compositions of the invention can also contain any number of other constituents as necessitated by the application such as wetting agents, pigments and dyes, foaming and defoaming agents (e.g. aliphatic acids or esters; vegetable oils, waxes, mineral oils as well as their sulfated derivatives, silicones, such as dimethyl silicone, glycol polysiloxane, methylphenol polysiloxane, trialkyl or tetraalkyl silanes, and hydrophobic silica defoamers), softening agents, anti-static agents, dye transfer inhibition/color protection agents, odor removal/odor capturing agents, builders, brighteners, water repellency agents, allergicides, soil suspenders, anti-redeposition agents, anti-freeze agents, and mixtures thereof.

Methods Employing the Present Antimicrobial Compositions

The invention includes methods employing the present antimicrobial compositions. For example, the invention includes a method for reducing the microbial population on a hard or soft surface, a method for reducing the population of a microorganism on skin, a method for treating a disease of skin, or a method for reducing an odor. The composition, which is a concentrate, or a diluted version thereof, can be applied to or brought into contact with an object by any conventional method or using any apparatus for applying an antimicrobial or cleaning composition to the object. Contacting can include any of numerous methods for applying a composition such as spraying the composition, impregnating the composition in wipes (woven or non-woven textile material) and using the wipes to wipe down a surface to be treated, immersing an object in the composition, foam or gel treating an object with the composition, misting and fogging, or a combination thereof. The composition can also be caused to flow over the surface, or the surface can be dipped into the composition. Contacting can be manual or by machine.

Excluded Ingredients

The present compositions are substantially free of, or free of, additional antimicrobial compounds other than those compounds expressly disclosed as being included. Such additional antimicrobial compounds include hydrogen peroxide, sources of hydrogen peroxide (e.g. sodium perborate, sodium percarbonate), parabens, aldehydes (e.g. formaldehyde), aldehyde releasing agents, phenols, biguanides, peroxycarboxylic acids, quaternary ammonium compounds, chlorine compounds (e.g. hypochlorites), halogen releasing agents, aromatic diamidines, heavy metal ions, anilides, enzymes, and etchants.

The term "etchant" refers to the etchants disclosed in WO 2008/080097 originally assigned to ADVANCED TECHNOLOGY MATERIALS, INC., and includes fluorinated compounds such as: hydrofluoric acid (HF); fluorosilicic acid ($H_2SiF_6$); fluoroboric acid; ammonium fluorosilicate salt ((NH4hSiF6); tetramethylammonium hexafluorophosphate; ammonium fluoride salts; ammonium bifluoride salts; tetrabutylammonium tetrafluoroborate (TBA-BF4); propylene glycol/HF in a weight ratio of about 90:10 to about 99:1, preferably about 93:7 to about 98:2; propylene glycol/tetraalkylammonium fluoride, where the alkyl groups may be the same as or different from one another and are selected from the group consisting of straight chained or branched C1-C6 alkyl groups (e.g., methyl, ethyl, propyl, butyl, pentyl, hexyl), in a weight ratio of about 75:25 to about 95:5, or about 80:20 to about 90:10; propylene glycol/tetrabutylammonium fluoride in a weight ratio of about 75:25 to about 95:5, or about 80:20 to about 90:10; propylene glycol/benzyltrimethylammonium fluoride in a weight ratio of about 75:25 to about 95:5, or about 80:20 to about 90:10; and combinations thereof.

INDUSTRIAL APPLICATION

The compositions of the invention can be used for a variety of domestic (e.g. residential) or industrial (e.g. commercial, institutional, agricultural) applications. They can be included in products such as sterilants, sanitizers, disinfectants, preservatives, deodorizers, antiseptics, fungicides, germicides, sporicides, virucides, detergents and hard and soft surface cleaners. The compositions can exhibit activity against pathogens including fungi, molds, bacteria, spores, and viruses, for example, *Trycophyton* sp., *Aspergillus* sp., *Staphylococcus* sp., antibiotic resistant *Staphylococcus* sp., *E. coli*, *Streptococcus* sp., *Enterococcus* sp., *Legionella* sp., *Pseudomonas* sp., *Mycobacterium* sp., *Clostridium* sp., influenza and hepatitis viruses, phages, and the like. Such pathogens can cause a variety of diseases and disorders, including tuberculosis, lung and tissue infections, septicemic infections, hemolytic gastroenteritis, influenza, hepatitis, and the like. The compositions can be applied in a variety of areas including kitchens, bathrooms, factories, hospitals, dental offices and food plants. The antimicrobial compositions can also be used in veterinary products such as mammalian skin treatments or in products for sanitizing or disinfecting animal enclosures, watering stations, and veterinary treatment areas such as inspection tables and operation rooms. The present compositions can be employed in an antimicrobial foot bath for livestock or as a boot or shoe sole dip for people.

Suitable hard surfaces that can be treated with compositions according to the invention include, for example, architectural surfaces (e.g., floors, walls, windows, sinks, tables, counters and signs); eating utensils; hard-surface medical or surgical instruments and devices; and hard-surface packaging. Such hard surfaces can be made from a variety of materials including, for example, ceramic, metal, glass, wood, or hard plastic. Suitable soft surfaces include, for example fabrics, filter media, hospital and surgical linens and garments; soft-surface medical or surgical instruments and devices; and soft-surface packaging. Such soft surfaces can be made from a variety of materials including, for example, paper, fiber, woven or nonwoven fabric, soft plastics and elastomers. The compositions of the invention can also be applied to soft surfaces such as food, skin (e.g., a hand) and other external or mucosal surfaces of an animal to reduce the population of microorganisms thereon. The present compositions can be employed as a foaming or nonfoaming environmental sanitizer or disinfectant.

The antimicrobial compositions can also be used on foods and plant species to reduce surface microbial populations and also at manufacturing or processing sites handling such foods and plant species. For example, the compositions can be used on food transport lines (e.g., as conveyor belt sprays); boot and hand-wash dip-pans; food storage facilities; refrigeration and cooler equipment; beverage chillers and warmers, blanchers, cutting boards, third sink areas, and meat chillers or scalding devices. Foodstuffs that can be treated with compositions of the invention include eggs, seeds, leaves, fruits and vegetables. Plant surfaces include both harvested and growing leaves, roots, seeds, skins or shells, stems, stalks, tubers, corn, fruit, and the like.

Compositions according to the invention are useful at all temperature ranges, i.e. from about −30° C. to about 80° C. It is expected that at higher temperatures, antimicrobial contact times can be reduced.

The present invention may be better understood with reference to the following example. This example is intended to be representative of a specific embodiment of the invention and is not intended to limit the scope of the invention herein described and claimed.

EXAMPLES

COMPOSITION 1 (Table 1) was prepared using the ingredients described in Table 2

TABLE 1

COMPOSITION 1

| Ingredient | Amount (wt. %) |
| --- | --- |
| Dowanol PnP | 30.6 |
| Salicylic acid | 3.06 |
| Alfonic L610-3.5 | 19.13 |
| Biosoft S-101 | 26.78 |
| Dowfax C10L | 1.03 |
| Cobratec 35-G | 1.11 |
| Phosphoric acid | 17.33 |
| Dequest 2010 | 0.96 |

TABLE 2

Description of Ingredients

| Classification | Ingredient Identity__Brand Name__Commercial Source (% w/w/ active) |
| --- | --- |
| Anionic Surfactant | Alkyl (C10-16) benzenesulfonic acid__Bio-Soft S-101__Stepan (96% w/w active) Mono/di-alkyl (C10) diphenyloxide disulfonate__Dowfax C10L__Dow Chemicals (45% w/w active) |
| Cyclic Carboxylic Acid | Salicylic acid__N/A__Sigma Aldrich (≥99% w/w active) Phenylacetic acid__N/A__Sigma Aldrich (99% w/w active) |
| Nonionic Surfactant | Alcohols, C6-C12, ethoxylated__Alfonic L610-3.5__Sasol Limited (100% w/w active) |
| Non-surfactant Strong Acid | Phosphoric acid__N/A__Sigma Aldrich (75 % w/w active) |
| Chelating agent | Etidronic acid (HEDP)__Dequest 2010__Italmatch Chemicals (60% w/w active) |
| Glycol Ether Solvent | Propylene glycol n-propyl ether__Dowanol PnP__Dow Chemicals (>99% w/w active) |
| Corrosion Inhibitor | Benzotriazole__N/A__Cobratec 35G__PMC Specialties Group (35% w/w active) |

As the ingredients in Table 2 are not in all cases 100% pure compounds, Table 3 summarizes the actual concentrations of the chemical ingredients in COMPOSITION 1,

TABLE 3

| INGREDIENT | ACTUAL CONCENTRATION (WT. %) |
| --- | --- |
| Tripropyleneglycol methyl ether | 30 |
| Propylene glycol | 0.722 |
| Salicylic acid | 3.06 |
| C6-C12 Ethoxylated Alcohol (avg. 3.5 units of ethoxylation) | 19.13 |
| C10-C16 alkylbenzenesulfonic acid | 26.4 |
| Decyl diphenyloxide disulfonate | 0.386 |
| Benzotriazole | 0.388 |
| Phosphoric acid | 13 |
| Etidronic acid | 0.576 |
| Impurities | 1.073 |
| Water | 5.265 |

It is important to note that the measurements above are subject to normal batch-to-batch variations and measurement errors.

COMPOSITION 1 was prepared in one large batch which was then split into four equal portions. A first portion was tested immediately at time=0. The other three portions were sealed in containers 1, 2, and 3 and stored in a 70° C. oven to undergo accelerated aging. The portions of containers 1, 2 and 3 were tested at time=2, 4, and 6 weeks, respectively. All portions were tested for pH and antimicrobial efficacy using the ASTM E2197 Test Method and the values were plotted in FIG. 1. (The ASTM Test Method entails placing an inoculum of bacteria containing 5 wt. % soil load on a brushed stainless-steel disk, drying the bacterial inoculum, and subsequently exposing the dried inoculum to the disinfectant formula, for a period of 2 minutes, followed by enumeration of the surviving bacterial in order to calculate log reduction. In the tests, the portions were diluted with deionized water at a ratio of 1:64 (composition 1: water).

FIG. 1 shows that, surprisingly, the antimicrobial efficacy of COMPOSITION 1 did not diminish over a period of six weeks under the conditions of the test. One week of incubation at 70° C. roughly equals to one year of storage at room temperature (about 21-23° C.) according to a prediction of a typical chemical reaction rate increase using the Arrhenius equation. Thus, COMPOSITION 1 was shown to have a shelf-life at room temperature of at least six years.

The present compositions can be used in a method of reducing the microbial load on a surface, the method comprising, consisting essentially of, or consisting of identifying a surface in need of microbial reduction, applying a composition according to the present invention to the surface for a time sufficient to reduce the antimicrobial population by at least 1 log, preferably at least 2 log, more preferably at least 3 log, and most preferably at least 4, 5, or 6 log. The time of application can be up to 2, 3, 4, or 5 minutes. The method may further comprise, consist essentially of, or consist of diluting the composition prior to use with a diluent, such as water and/or an organic solvent. Furthermore, an additional antimicrobial agent, such as hydrogen peroxide, can be added at the time of use to further boost the antimicrobial efficacy of the solution.

The embodiments of the invention described herein is by way of example only and shall not be construed to limit the scope of the invention herein described. The person skilled in the art will appreciate that variations to the afore-mentioned embodiments are possible without departing from the scope of the invention herein described.

The invention claimed is:

1. A shelf-stable antimicrobial composition comprising:
   a. at least one cyclic carboxylic acid and/or salt thereof in an amount from about 1 wt. % to about 10 wt. %;
   b. at least one anionic surfactant in an amount from about 10 wt. % to about 35 wt. %;
   c. at least one non-surfactant strong acid having a pKa less than about 2.3 in an amount from about 2 wt. % to about 25 wt. %;
   d. at least one chelating agent in an amount from about 0.1 wt. % to about 10 wt. %;
   e. optionally, at least one corrosion inhibitor in an amount of from about 0.1 wt. % to about 2 wt. %;
   f. optionally, at least one nonionic surfactant in an amount from about 15 wt. % to about 25 wt. %;
   g. optionally, at least one organic solvent in an amount from about 25 wt. % to about 36 wt. %; an
   h. optionally, water, q.s. to 100;
   wherein the composition retains at least 90% of its original antimicrobial efficacy after storage for at least five years at room temperature, and is substantially free of hydrogen peroxide, sources of hydrogen peroxide, parabens, aldehydes, aldehyde releasing agents, phenols, biguanides, peroxycarboxylic acids, quaternary ammonium compounds, chlorine compounds, enzymes, and etchants.

2. The composition of claim 1, wherein the at least one corrosion inhibitor is present.

3. The composition of claim 1, wherein the at least one nonionic surfactant is present.

4. The composition of claim 1, wherein the at least one organic solvent is present.

5. The composition of claim 1, comprising water and having a pH of less than about 1.5.

6. The composition of claim 5, wherein the composition has a pH up to about 0.8.

7. The composition of claim 1, wherein the at least one cyclic carboxylic acid is selected from the group consisting of salicylic acid, furoic acid, mandelic acid, phthalic acid, phenylacetic acid and benzoic acid.

8. The composition of claim 1, wherein the at least one non-surfactant acid having a pKa less than about 2.3 is selected from the group consisting of phosphoric acid, pyrophosphoric acid, phosphonic acid, polyphosphoric acid, methane sulfonic acid, benzene sulfonic acid, ethane sulfonic acid, propane sulfonic acid, butane sulfonic acid, toluene sulfonic acid, xylene sulfonic acid, sulfosalicylic acid, and sulfamic acid.

9. The composition of claim 2, wherein the at least one corrosion inhibitor is chosen from benzotriazole and tolyltriazole.

10. The composition of claim 1, wherein the at least one chelating agent is selected from the group consisting of etidronic acid, nitrilotrimethylphosphonic acid, 2-phosphonobutane-1,2,4-tricarboxylic acid, diethylenetriamine penta(methylene phosphonic acid), dihexylenetriamine penta(methylene phosphonic acid), ethylenediamine tetra(methylene phosphonic acid), hexaethylenediamine tetra(methylene phosphonic acid), 2-hydroxyphosphonocarboxylic acid, N,N-dicarboxymethyl glutamic acid, picolinic acid, dipicolinic acid, nitrilotriacetic acid, ethylenediamine tetrakis methylenephosphonic acid, diethylenetriamine pentakis methylenephosphonic acid, cyclohexane-1,2-tetramethylene phosphonic acid, amino[tri(methylene phosphonic acid)], and salts thereof.

11. The composition of claim 3, wherein the at least one nonionic surfactant is selected from the group consisting of C6-C18 ethoxylated and/or propoxylated alcohols, alkyl glucosides, and alkyl polyglucosides.

12. The composition of claim 4, wherein the at least one organic solvent is selected from the group consisting of propylene glycol, dipropylene glycol, diethylene glycol n-butyl ether, diethylene glycol n-propyl ether, diethylene glycol ethyl ether, diethylene glycol methyl ether, diethylene glycol t-butyl ether, dipropylene glycol n-butyl ether, dipropylene glycol methyl ether, dipropylene glycol ethyl ether, dipropylene glycol propyl ether, dipropylene glycol tert-butyl ether, ethylene glycol butyl ether, ethylene glycol propyl ether, ethylene glycol ethyl ether, ethylene glycol methyl ether, ethylene glycol methyl ether acetate, propylene glycol n-butyl ether, propylene glycol ethyl ether, propylene glycol methyl ether, propylene glycol n-propyl ether, tripropylene glycol methyl ether and tripropylene glycol n-butyl ether, ethylene glycol phenyl ether, and propylene glycol phenyl ether.

13. The composition of claim 1, diluted with at least one of water and an organic solvent in a composition:diluent ratio of from about 1:8 to about 1:512.

14. The composition of claim 13, diluted with at least one of water and an organic solvent in a composition:diluent ratio of from about 1:32 to about 1:256.

15. The composition of claim 14, wherein the composition is diluted with water, and wherein the diluted composition has a pH that is from about 1.6 to about 3.4.

16. A shelf-stable concentrated antimicrobial composition comprising:
   a. at least one cyclic carboxylic acid and/or salt thereof in an amount from about 2.8 wt. % to about 3.3 wt. %;
   b. at least one anionic surfactant in an amount from about 26 wt. % to about 30 wt. %;
   c. at least one non-surfactant strong acid having a pKa of less than about 2.3 in an amount from about 11 wt. % to about 15 wt. %;
   d. at least one chelating agent in an amount from about 0.3 wt. % to about 0.8 wt. %;
   e. at least one corrosion inhibitor in an amount of from about 0.2 wt. % to about 0.5 wt. %;
   f. at least one nonionic surfactant in an amount from about 17 wt. % to about 22 wt. %;

g. at least one organic solvent in an amount from about 27 wt. % to about 33 wt. %; and h. water, q.s. to 100;

wherein the composition retains at least 90% of its original antimicrobial efficacy after storage for at least five years at room temperature, and is substantially free of hydrogen peroxide, sources of hydrogen peroxide, parabens, aldehydes, aldehyde releasing agents, phenols, biguanides, peroxycarboxylic acids, quaternary ammonium compounds, chlorine compounds, enzymes, and etchants.

17. The composition of claim 1, wherein the at least one anionic surfactant is selected from the group consisting of C8-C18 alkyl benzene sulfonic acids, C6-C18 diphenyloxide disulfonic acids, C6-C22 alkyl phosphate esters, alkyl sulfuric acids, alkyl ether sulfuric acids, alkyl-(ethoxy/propoxy)carboxylic acids, acyl amino acids, and salts thereof.

18. The composition of claim 16, wherein the at least one anionic surfactant is selected from the group consisting of C8-C18 alkyl benzene sulfonic acids, C6-C18 diphenyloxide disulfonic acids, C6-C22 alkyl phosphate esters, alkyl sulfuric acids, alkyl ether sulfuric acids, alkyl-(ethoxy/propoxy)carboxylic acids, acyl amino acids, and salts thereof.

19. A method of reducing the microbial load on a surface contaminated with microbes, comprising applying an effective amount of the composition of claim 14 to the surface for up to five minutes, wherein the microbial load is reduced by at least 1 log.

20. A shelf-stable, concentrated antimicrobial composition which, when diluted with a diluent, produces a composition according to claim 1.

21. The composition of claim 1, wherein the at least one organic solvent is selected from the group consisting of diethylene glycol n-butyl ether, diethylene glycol n-propyl ether, diethylene glycol ethyl ether, diethylene glycol methyl ether, diethylene glycol t-butyl ether, dipropylene glycol n-butyl ether, dipropylene glycol methyl ether, dipropylene glycol ethyl ether, dipropylene glycol propyl ether, dipropylene glycol tert-butyl ether, ethylene glycol butyl ether, ethylene glycol propyl ether, ethylene glycol ethyl ether, ethylene glycol methyl ether, ethylene glycol methyl ether acetate, propylene glycol n-butyl ether, propylene glycol ethyl ether, propylene glycol methyl ether, propylene glycol n-propyl ether, tripropylene glycol methyl ether and tripropylene glycol n-butyl ether, ethylene glycol phenyl ether, and propylene glycol phenyl ether.

* * * * *